(12) United States Patent
Yang et al.

(10) Patent No.: US 7,242,543 B1
(45) Date of Patent: Jul. 10, 2007

(54) FILTER DEVICE

(75) Inventors: Sheng-Chieh Yang, Hsinchu (TW); Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/553,457

(22) Filed: Oct. 26, 2006

(30) Foreign Application Priority Data

Dec. 27, 2005 (TW) ............................. 94146678 A

(51) Int. Cl.
*G02B 5/22* (2006.01)
(52) U.S. Cl. ...................... 359/891; 359/885; 348/743; 356/418; 353/84; 362/293
(58) Field of Classification Search ............... 359/885, 359/891; 348/743; 353/84; 356/418; 362/293
See application file for complete search history.

(56) References Cited

U.S. PATENT DOCUMENTS 6,147,720 A * 11/2000 Guerinot et al. ............ 348/744
6,278,563 B1 * 8/2001 Hewlett ...................... 359/888
6,962,414 B2 * 11/2005 Roth ............................ 353/20
7,131,762 B2 * 11/2006 Richards et al. ............ 362/583
7,165,847 B2 * 1/2007 Pettitt ......................... 353/84
2006/0132722 A1 * 6/2006 Colpaert ..................... 353/84
2007/0035646 A1 * 2/2007 Mihara et al. .............. 348/272

* cited by examiner

*Primary Examiner*—Leonidas Boutsikaris
(74) *Attorney, Agent, or Firm*—Jianq Chyun IP Office

(57) ABSTRACT

A filter device including a red filter unit, a green filter unit, a blue filter unit and at least one of a yellow filter unit, a cyan filter unit and a magenta filter unit is provided. Red light, green light and blue light are produced when white light passes through the red filter unit, the green filter unit and the blue filter unit. In the CIE1931 color space coordinate, a triangle color space is formed through joining the points representing the red, green and blue light. Moreover, yellow light, magenta light and cyan light are produced when white light passes through the yellow filter unit, the magenta filter unit and the cyan filter unit. In the CIE1931 color space coordinate, the minimum distance from the points representing the yellow, magenta and cyan light to the edge of the triangle is not exceeding in 0.03.

20 Claims, 7 Drawing Sheets

FILTER DEVICE

CROSS-REFERENCE TO RELATED APPLICATION

This application claims the priority benefit of Taiwan application serial no. 94146678, filed Dec. 27, 2005. All disclosure of the Taiwan application is incorporated herein by reference.

BACKGROUND OF THE INVENTION

1. Field of the Invention

The present invention relates to an optical device. More particularly, the present invention relates to a filter device.

2. Description of the Related Art

The illumination system of most projection apparatus is suitable for providing a light beam. After the light beam has passed through a filter device (for example, a color wheel), the filtered light beam is projected on a display device through a series of focusing lenses. Then, the display device transforms the light beam into an image. Finally, the image is projected onto a display screen through a projection lens.

A conventional filter device includes a red filter unit, a blue filter unit and a green filter unit. These filter units are used for filtering incident white light into red light, green light and blue light. As shown in FIG. 1, the points R, G, B corresponding to the red light, the green light and the blue light in the CIE (International Commission on Illumination) 1931 chromaticity diagram form a triangular area. By mixing the red light, the green light, and the blue light, various colors light beams within the triangular area are produced so that the projection apparatus projects color images.

In the conventional technique, the filter device further includes a yellow filter unit, a magenta filter unit and a cyan filter unit in addition to the red filter unit, the blue filter unit and the green filter unit for enhancing the color saturation of the image. Aside from generating red light, green light and blue light, the filter device also produces yellow light, magenta light and cyan light.

Although mixing the aforementioned six colors light increases the color saturation of the image, the points Y, M, C that correspond to the yellow light, the magenta light and the cyan light in the CIE 1931 chromaticity diagram deviate from the triangle area formed by the three points R, G and B. As a result, the gray scale of the image is not smooth, which deteriorates the image quality produced by the projection apparatus. Therefore, the demand for high color saturation in the projection apparatus is not met.

SUMMARY OF THE INVENTION

Accordingly, the present invention is directed to provide a filter device that gray scale of the image provided by a display apparatus is smoother.

As embodied and broadly described herein, the invention provides a filter device. The filter device includes a red filter unit, a green filter unit, a blue filter unit and a yellow filter unit. A wavelength corresponding to the 50% transmittance in the transmission spectrum of the yellow filter unit is $\alpha_1$. A wavelength corresponding to the transmittance rising to the 50% in the transmission spectrum of the green filter unit is $\alpha_2$. The values of $\alpha_1$ and $\alpha_2$ are related by the inequality: $|\alpha_1-\alpha_2|\leq 20$ nm.

As embodied and broadly described herein, the present invention provides another filter device. The filter device includes a red filter unit, a green filter unit, a blue filter unit and a cyan filter unit. A wavelength corresponding to the 50% transmittance in the transmission spectrum of the cyan filter unit is $\alpha_3$. A wavelength corresponding to the transmittance dropping to 50% in the transmission spectrum of the green filter unit is $\alpha_4$. The values of $\alpha_3$ and $\alpha_4$ are related by the inequality: $|\alpha_3-\alpha_4|\leq 10$ nm.

As embodied and broadly described herein, the present invention also provides yet another filter device. The filter device includes a red filter unit, a green filter unit, a blue filter unit and a magenta filter unit. A wavelength corresponding to the transmittance dropping to 50% in the transmission spectrum of the magenta filter unit is $\alpha_5$. A wavelength corresponding to the 50% transmittance in the transmission spectrum of the blue filter unit is $\alpha_6$. The values of $\alpha_5$ and $\alpha_6$ are related by the inequality: $|\alpha_5-\alpha_6|\leq 20$ nm. In addition, A wavelength corresponding to the transmittance rising to 50% in the transmission spectrum of the magenta filter unit is $\alpha_7$. A wavelength corresponding to the 50% transmittance in the transmission spectrum of the red filter unit is $\alpha_8$. The values of $\alpha_7$ and $\alpha_8$ are related by the inequality: $|\alpha_7-\alpha_8|\leq 10$ nm.

In the filter device of the present invention, the points in the CIE 1931 chromaticity diagram corresponding to the yellow light, the magenta light and the cyan light produced by the yellow filter unit, the magenta filter unit and the cyan filter unit are located very close to or right on the edges of the triangle that result from joining the points corresponding to the red light, the green light and the blue light. Hence, the gray scale of the image provided by the display apparatus is smoother so that a better image quality is obtained.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
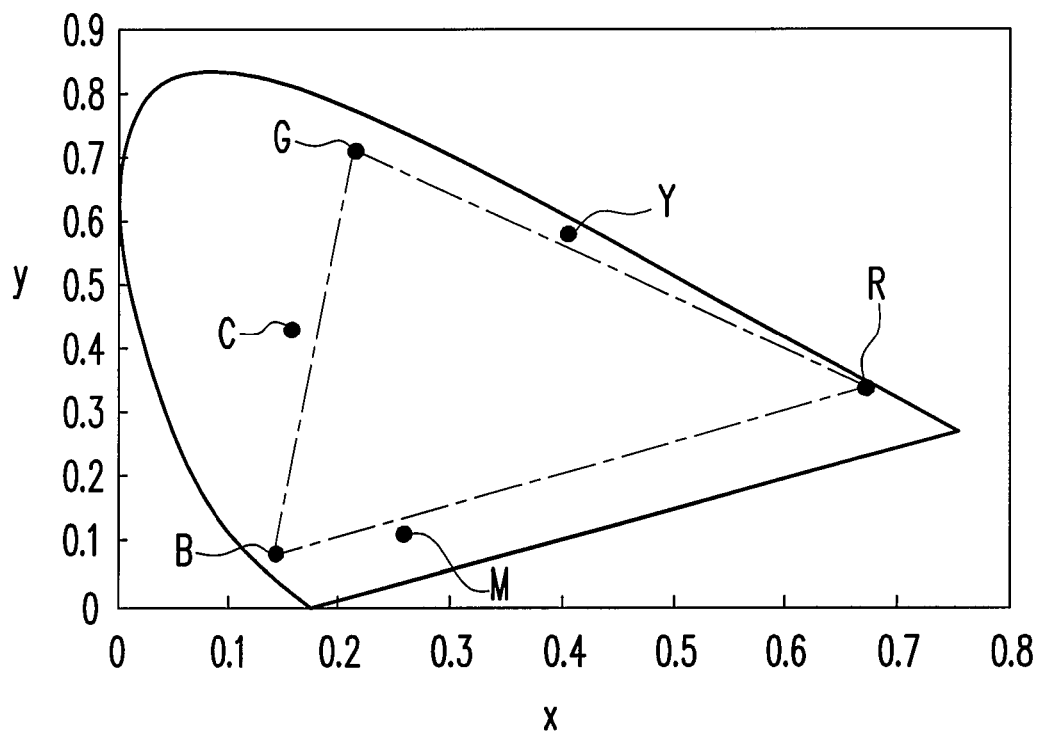
FIG. 1 is a graph showing points in the CIE 1931 chromaticity diagram corresponding to lights with different colors formed by a conventional filter device.
Figure 2:
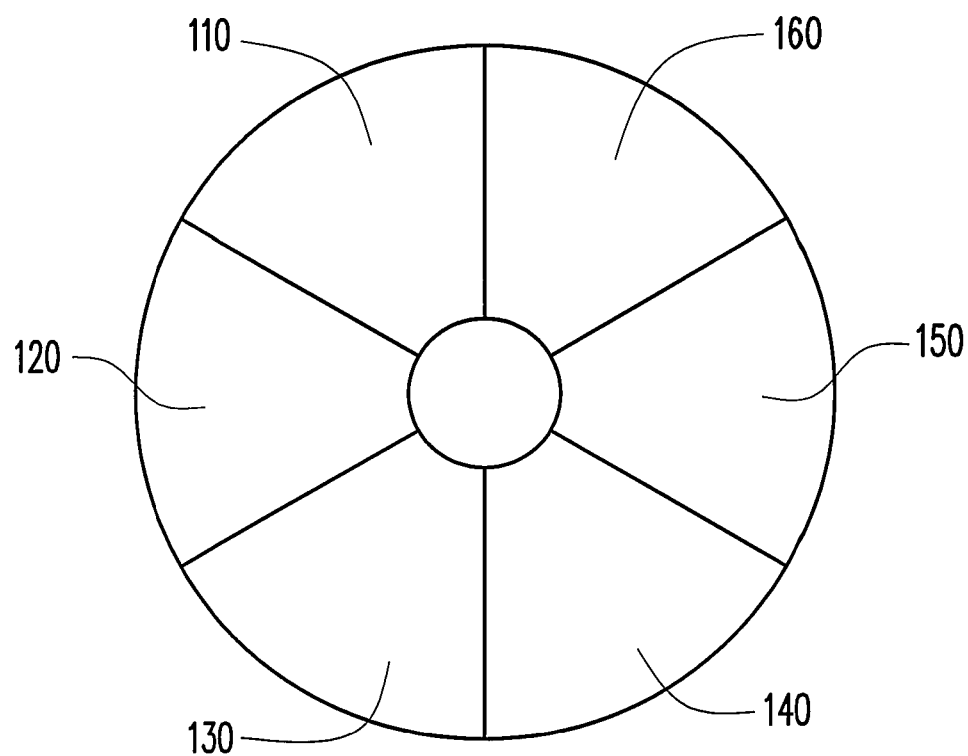
FIG. 2 is a diagram showing a filter device according to one embodiment of the present invention.
Figure 3:
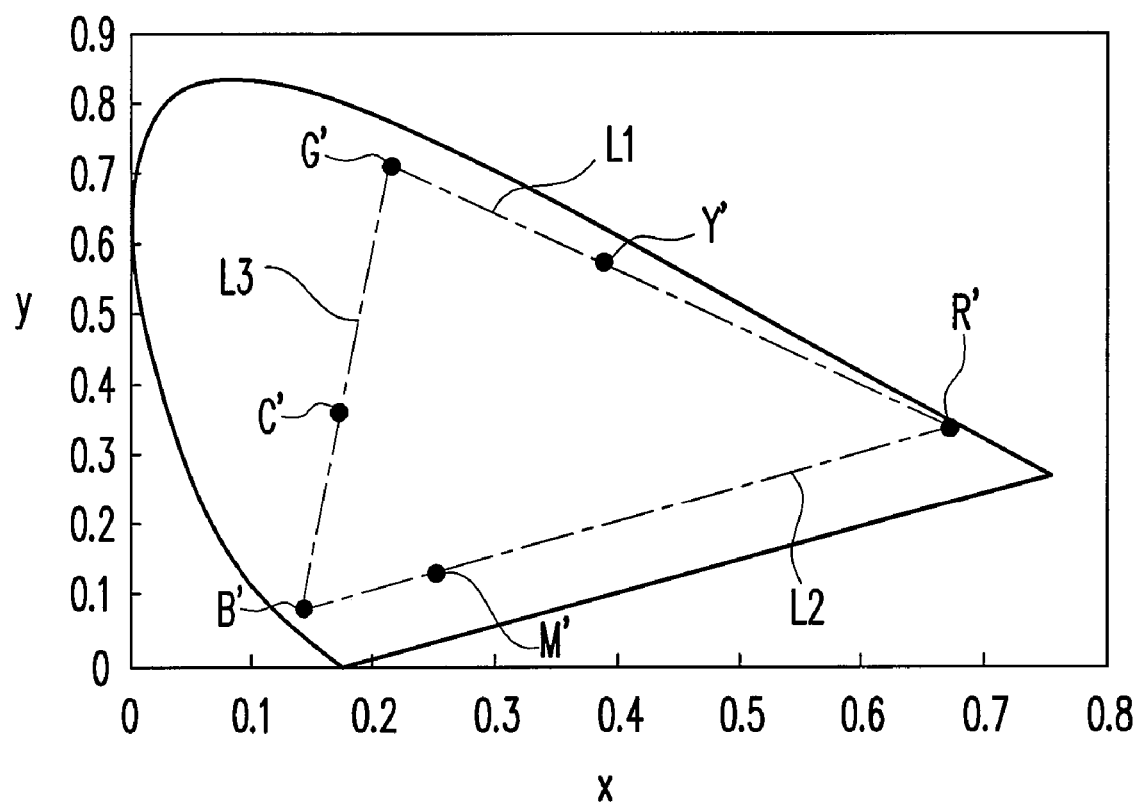
FIG. 3 is a graph showing points in the CIE 1931 chromaticity diagram corresponding to lights with different colors formed by a filter device according to one embodiment of the prevent invention.
Figure 4A:
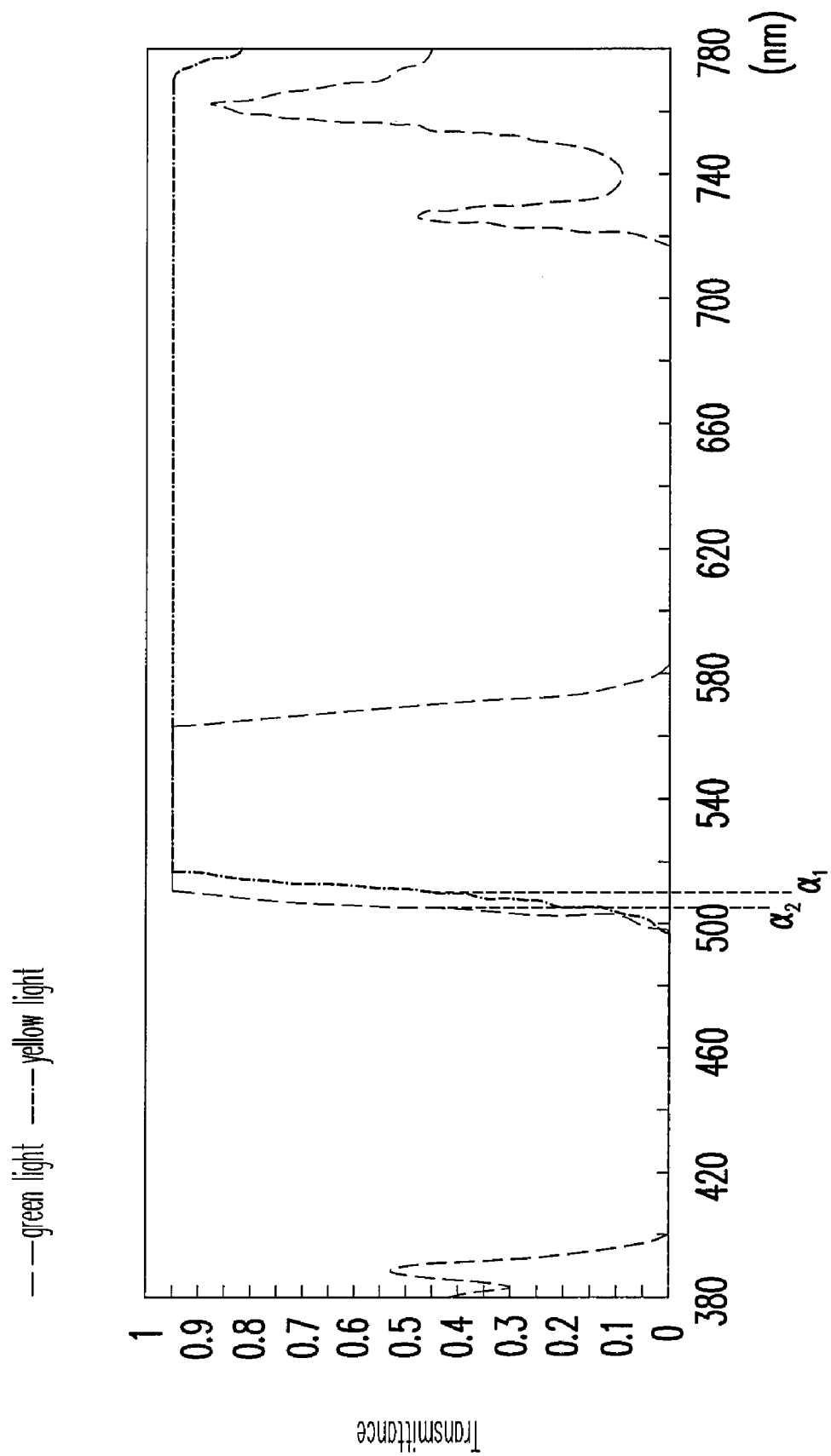
FIG. 4A shows a diagram of the transmission spectrum of a green filter unit and a yellow filter unit in a filter device according to one embodiment of the present invention.
Figure 4B:
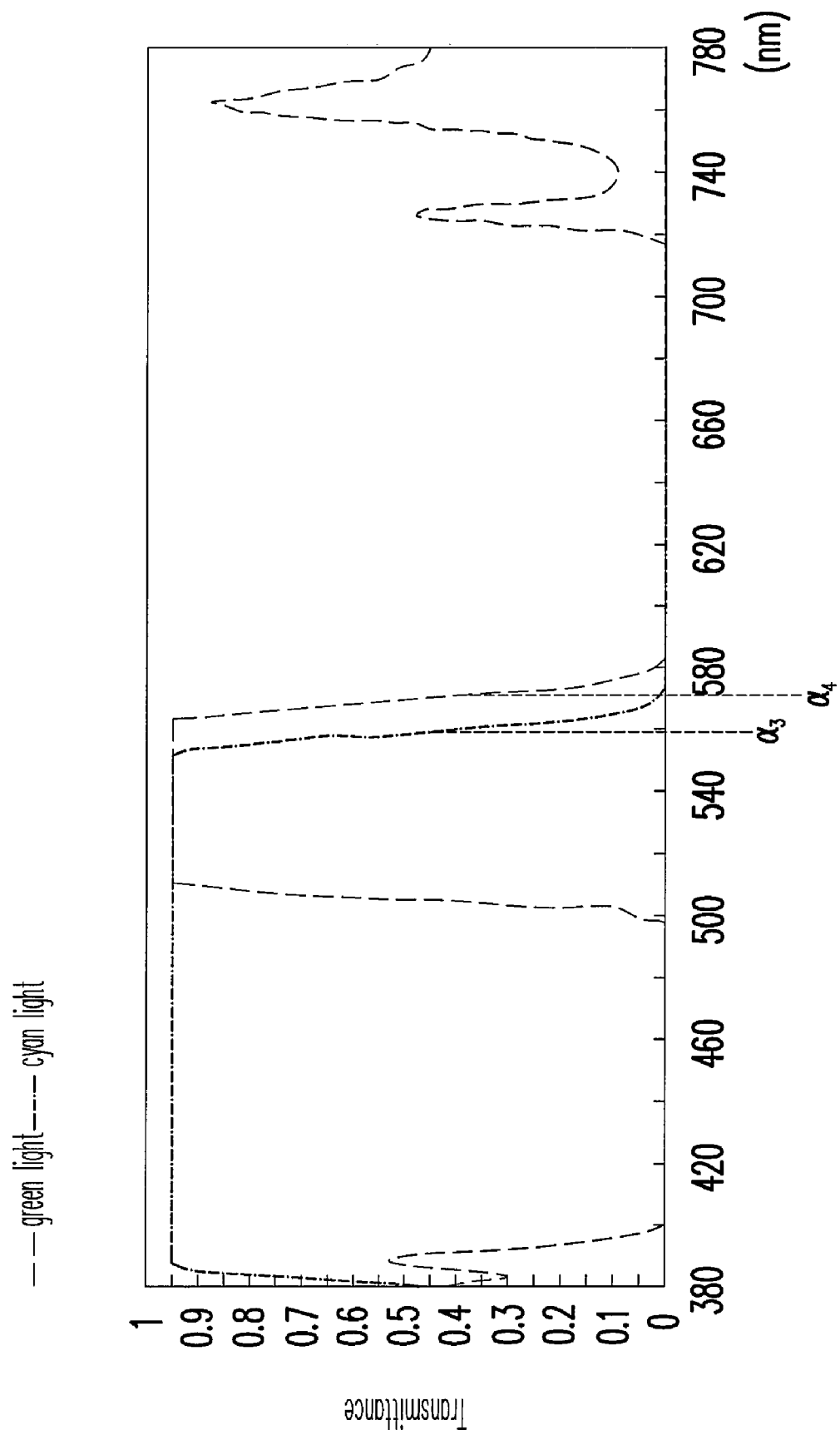
FIG. 4B shows a diagram of the transmission spectrum of a green filter unit and a cyan filter unit in a filter device according to one embodiment of the present invention.
Figure 4C:
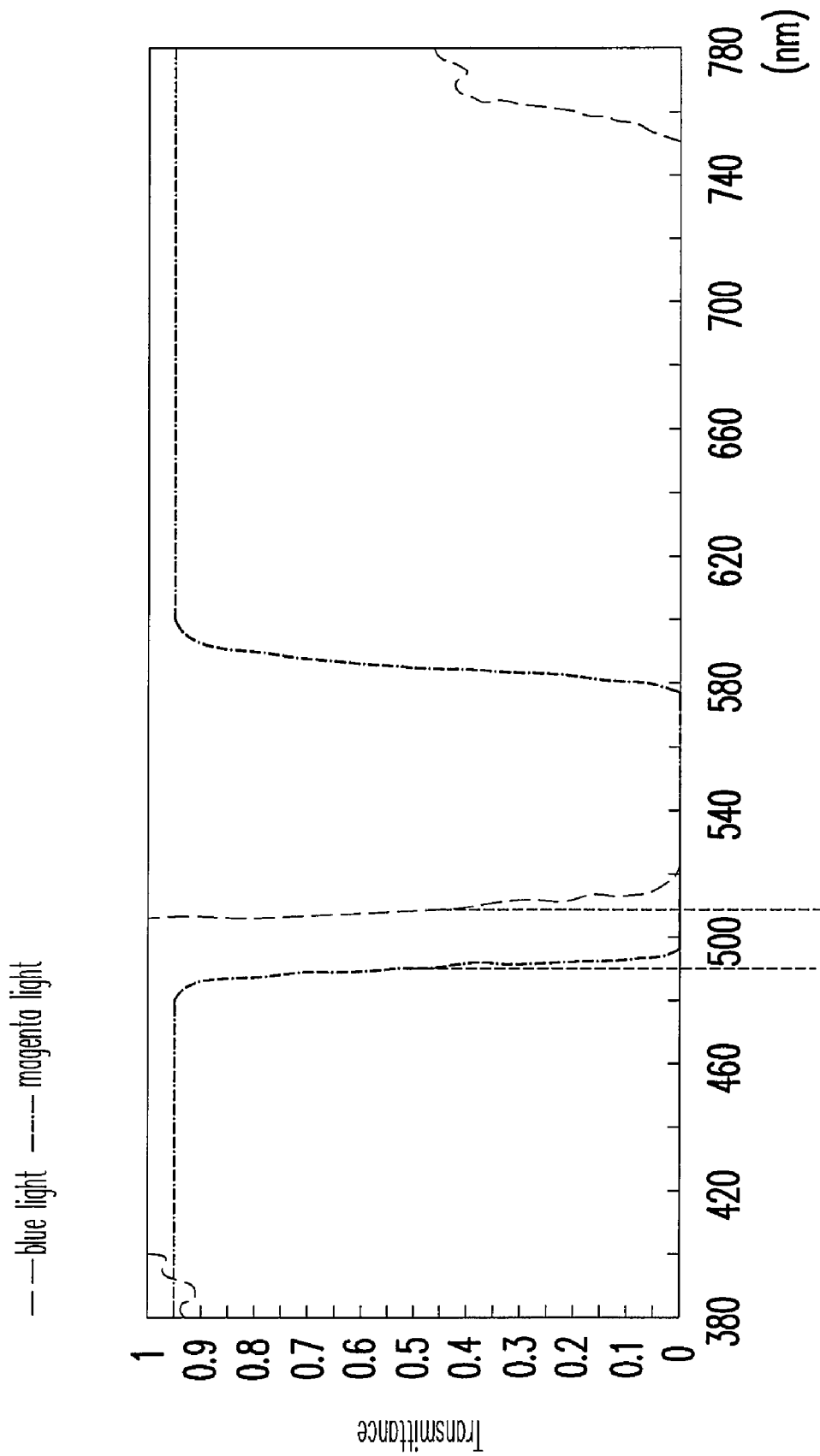
FIG. 4C shows a diagram of the transmission spectrum of a blue filter unit and a magenta filter unit in a filter device according to one embodiment of the present invention.
Figure 4D:
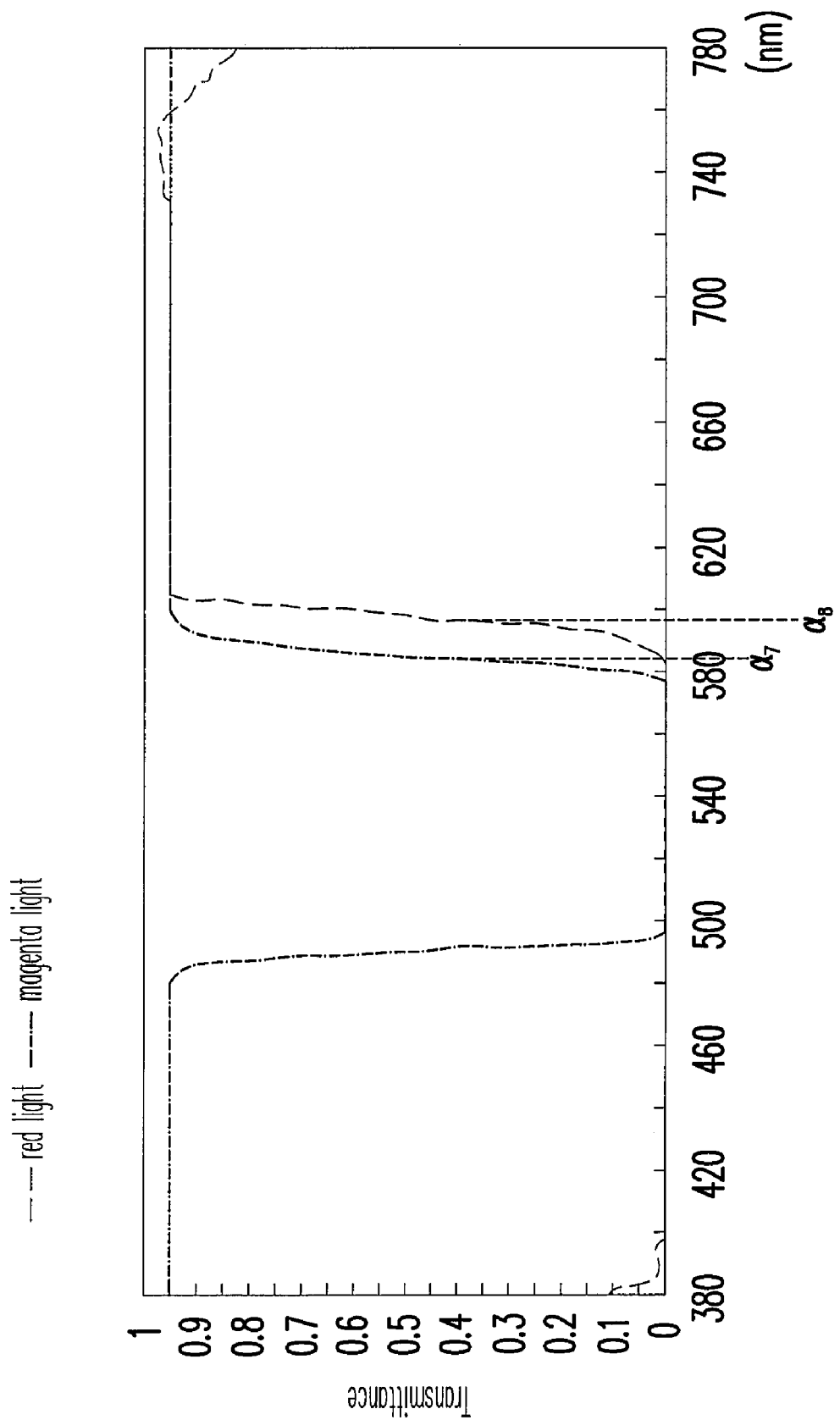
FIG. 4D shows a diagram of the transmission spectrum of a red filter unit and a magenta filter unit in a filter device according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The filter device in the present invention is a filter device for a digital display device, such as a color wheel or a filter having similar function with color wheel of a projection apparatus, or a color filter of a liquid crystal display. The filter device includes a plurality of filter units for producing light with different colors. These filter units are, for example, the filter plate of a color wheel or the filter pattern in a color filter. In the following, a color wheel is used as an example to illustrate various aspects of the filter device. However, this should by no means limit the scope of the present invention as such. In fact, one ordinary skill in the art can easily modify the embodiment in the following description. Despite the modifications, the spirit of the present invention is still there and hence should be considered as within the scope of the present invention.

As shown in FIGS. 2, 3 and 4A through 4D, the filter device 100 in the present embodiment is a color wheel. Aside from having a red filter unit 110, a green filter unit 120 and a blue filter unit 130, the color wheel further includes a yellow filter unit 140, a magenta filter unit 150 and a cyan filter unit 160. The red filter unit 110, the green filter unit 120 and the blue filter unit 130 are capable of filtering white light to produce red light, green light and blue light, respectively. Furthermore, the points R', G' and B' in the CIE 1931 chromaticity diagram that correspond to the red light, the green light and the blue light form a triangular area. The yellow filter unit 140, the magenta filter unit 150 and the cyan filter unit 160 filter white light to produce yellow light, magenta light and cyan light respectively. Although the filter device 100 in the present embodiment has six filter units, the present invention also permits a combination of the red, green and blue filter units with at least one of the yellow filter unit 140, the magenta filter unit 150 and the cyan filter unit 160.

To produce a smoother gray scale of the image displayed by the display apparatus of the present invention, in the CIE 1931 chromaticity diagram, the shortest distance from the point Y' that corresponds to yellow light to the edge line L1, the shortest distance from the point M' that corresponds to magenta light to the edge line L2 and the shortest distance from the point C' that corresponds to cyan light to the edge line L3 do not exceed in 0.03. Preferably, the points Y', M' and C' are located on the edge lines L1, L2 and L3 respectively.

In order for the shortest distance between the point Y' that corresponds to yellow light and the edge line L1 not to exceed in 0.03, a wavelength corresponding to the 50% transmittance in the transmission spectrum of the yellow filter unit 140 is $\alpha_1$ and a wavelength corresponding to the transmittance rising to 50% in the transmission spectrum of the green filter unit 120 is $\alpha_2$. Furthermore, the values of $\alpha_1$ and $\alpha_2$ are related by the inequality: $|\alpha_1-\alpha_2|\leq 20$ nm. Similarly, in order for the shortest distance between the point C' that corresponds to cyan light and the edge line L3 not to exceed in 0.03, a wavelength corresponding to the 50% transmittance in the transmission spectrum of the cyan filter unit 160 is $\alpha_3$ and a wavelength corresponding to the transmittance dropping to 50% in the transmission spectrum of the green filter unit 120 is $\alpha_4$. Furthermore, the values of $\alpha_3$ and $\alpha_4$ are related by the inequality: $|\alpha_3-\alpha_4|\leq 10$ nm.

On the other hand, in order for the shortest distance between the point M' that corresponds to the magenta light and the edge line L2 not to exceed in 0.03, a wavelength corresponding to the transmittance dropping to 50% in the transmission spectrum of the magenta filter unit 150 is $\alpha_5$ and a wavelength corresponding to the 50% transmittance in the transmission spectrum of the blue filter unit 130 is $\alpha_6$. Furthermore, the values of $\alpha_5$ and $\alpha_6$ are related by the inequality: $|\alpha_5-\alpha_6|\leq 20$ nm. Similarly, a wavelength corresponding to the transmittance rising to 50% in the transmission spectrum of the magenta filter unit 150 is $\alpha_7$ and a wavelength corresponding to the 50% transmittance in the transmission spectrum of the red filter unit 110 is $\alpha_8$. Furthermore, the values of $\alpha_7$ and $\alpha_8$ are related by the inequality: $|\alpha_7-\alpha_8|\leq 10$ nm.

In one preferred embodiment, the value of $|\alpha_1-\alpha_2|$ is smaller than or equal to 10 nm, for example. The value of $|\alpha_3-\alpha_4|$ is smaller than or equal to 5 nm. The value of $|\alpha_5-\alpha_6|$ is smaller than or equal to 5 nm. Through the aforementioned conditional limitation of the spectrum, the gray scale is substantially smoother when at least one of the yellow filter unit 140, the magenta filter unit 150 and the cyan filter unit 160 is used together with the red filter unit 110, the green filter unit 120 and the blue filter unit 130. Thus, the display apparatus has a better color saturation and display effect to obtain high quality of images required by users.

Figure 5:
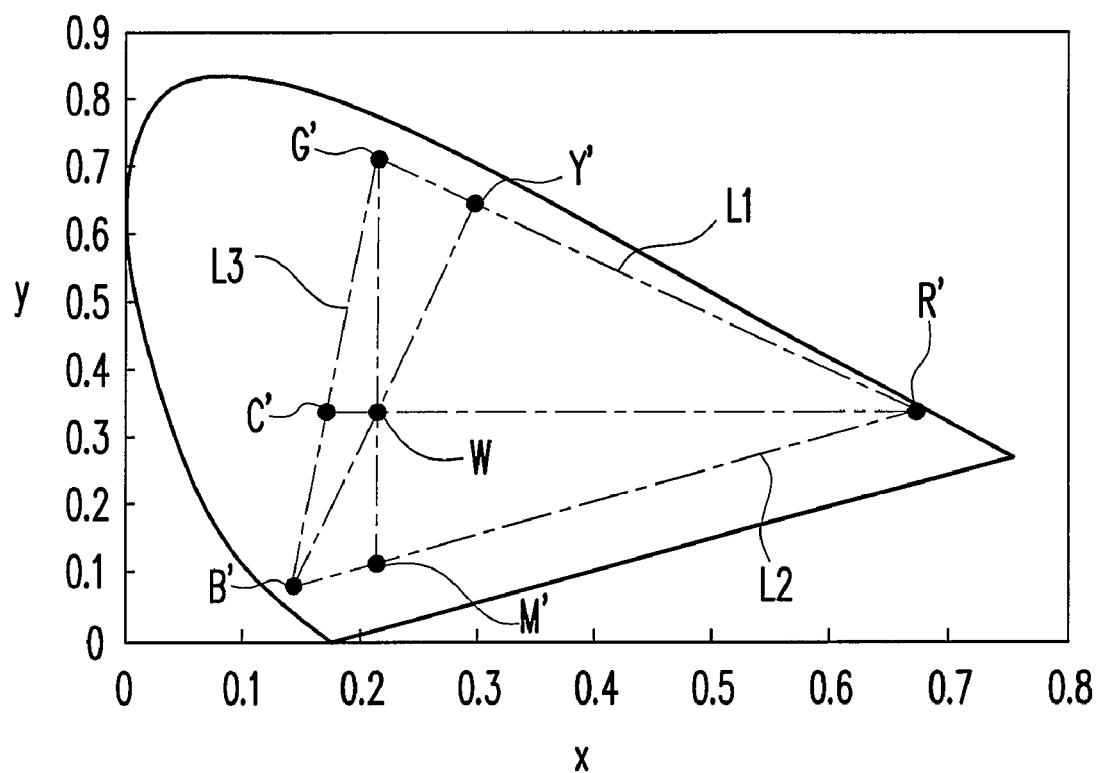
FIG. 5 is a graph showing points in the CIE 1931 chromaticity diagram corresponding to lights with different colors formed by a filter device according to another embodiment of the prevent invention.

FIG. 5 is a graph showing points in the CIE 1931 chromaticity diagram corresponding to light with different colors formed by a filter device according to another embodiment of the prevent invention. To provide a better white balance in the image displayed through the display apparatus, the point G' and the point M' and the point W that corresponds to white light in the CIE 1931 chromaticity diagram are all set on a same straight line. Similarly, the point W, the point Y' and the point B' all lie on a same straight line, and the point W, the point R' and the point C' all lie on a same straight line. In other words, the transmission spectrums of various filter units in the present invention are adjusted according to the position of the white point W in the CIE 1931 chromaticity diagram so that the image displayed by the display apparatus has a better white balance.

In summary, major advantages of the filter device in the present invention include at least the following:

1. The points corresponding to the yellow light, the magenta light and the cyan light in the CIE 1931 chromaticity diagram produced by the yellow filter, the magenta filter and the cyan filter are very close to or right on the edge lines of a triangle formed by the points corresponding to the red light, the green light and the blue light. Therefore, the gray scale of the image in the display apparatus is smoother and the image quality is better.

2. The filter device in the present invention has at least four colors of color filter units so that color saturation of the displayed image is improved.

3. The transmission spectrum of various filter units are adjusted according to the position of the point W that corresponds to white light in the CIE 1931 chromaticity diagram so that the white balance of the displayed image is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A filter device, comprising:
   a red filter unit;
   a green filter unit;
   a blue filter unit; and
   a yellow filter unit, wherein a wavelength corresponding to the 50% transmittance in the transmission spectrum of the yellow filter unit is $\alpha_1$, a wavelength corresponding to the transmittance rising to 50% in the transmission spectrum of the green filter unit is $\alpha_2$, and $|\alpha_1-\alpha_2|\leq 20$ nm.

2. The filter device as claimed in claim 1, wherein $|\alpha_1-\alpha_2|\leq 10$ nm.

3. The filter device as claimed in claim 1, wherein the blue filter unit is suitable for filtering white light to produce blue light, the yellow filter unit is suitable for filtering white light to produce yellow light, the points in the CIE 1931 chromaticity diagram corresponding to the white light, the blue light, and the yellow light fall on a same straight line.

4. The filter device as claimed in claim 1, further comprising a cyan filter unit, wherein a wavelength corresponding to the 50% transmittance in the transmission spectrum of the cyan filter unit is $\alpha_3$, a wavelength corresponding to the transmittance dropping to 50% in the transmission spectrum of the green filter unit is $\alpha_4$, and $|\alpha_3-\alpha_4|\leq 10$ nm.

5. The filter device as claimed in claim 4, wherein $|\alpha_3-\alpha_4|\leq 5$ nm.

6. The filter device as claimed in claim 4, wherein the red filter unit is suitable for filtering white light to produce red light, the cyan filter unit is suitable for filtering white light to produce cyan light, the points in the CIE 1931 chromaticity diagram corresponding to the white light, the red light, and the cyan light fall on a same straight line.

7. The filter device as claimed in claim 4, further comprising a magenta filter unit, wherein a wavelength corresponding to the transmittance dropping to 50% in the transmission spectrum of the magenta filter unit is $\alpha_5$, a wavelength corresponding to the 50% transmittance in the transmission spectrum of the blue filter unit is $\alpha_6$, and $|\alpha_5-\alpha_6|\leq 20$ nm; a wavelength corresponding to the transmittance rising to 50% in the transmission spectrum of the magenta filter unit is $\alpha_7$, a wavelength corresponding to the 50% transmittance in the transmission spectrum of the red filter unit is $\alpha_8$, and $|\alpha_7-\alpha_8|\leq 10$ nm.

8. The filter device as claimed in claim 7, wherein $|\alpha_7-\alpha_8|\leq 5$ nm.

9. The filter device as claimed in claim 7, wherein the green filter unit is suitable for filtering white light to produce green light, the magenta filter unit is suitable for filtering white light to produce magenta light, the points in the CIE 1931 chromaticity diagram corresponding to the white light, the green light, and the magenta light fall on a same straight line.

10. The filter device as claimed in claim 1, further comprising a magenta filter unit, wherein a wavelength corresponding to the transmittance dropping to 50% in the transmission spectrum of the magenta filter unit drops is $\alpha_5$, a wavelength corresponding to the 50% transmittance in the transmission spectrum of the blue filter unit is $\alpha_6$, and $|\alpha_5-\alpha_6|\leq 20$ nm, a wavelength corresponding to the transmittance rising to 50% in the transmission spectrum of the magenta filter unit is $\alpha_7$, a wavelength corresponding to the 50% transmittance in the transmission spectrum of the red filter unit is $\alpha_8$, and $|\alpha_7-\alpha_8|\leq 10$ nm.

11. The filter device as claimed in claim 10, wherein $|\alpha_5-\alpha_6|\leq 5$ nm.

12. The filter device as claimed in claim 10, wherein the green filter unit is suitable for filtering white light to produce green light, the magenta filter unit is suitable for filtering white light to produce magenta light, the points in the CIE 1931 chromaticity diagram that corresponding to the white light, the green light, and the magenta light fall on a same straight line.

13. A filter device, comprising:
    a red filter unit;
    a green filter unit;
    a blue filter unit; and
    a cyan filter unit, wherein a wavelength corresponding to the 50% transmittance in the transmission spectrum of the cyan filter unit is $\alpha_3$, a wavelength corresponding to the transmittance dropping to 50% in the transmission spectrum of the green filter unit is $\alpha_4$, and $|\alpha_3-\alpha_4|\leq 10$ nm.

14. The filter device as claimed in claim 13, wherein $|\alpha_3-\alpha_4|\leq 5$ nm.

15. The filter device as claimed in claim 13, wherein the red filter unit is suitable for filtering white light to produce red light, the cyan filter unit is suitable for filtering white light to produce cyan light, the points in the CIE 1931 chromaticity diagram corresponding to the white light, the red light, and the cyan light fall on a same straight line.

16. The filter device as claimed in claim 13, further comprising a magenta filter unit, wherein a wavelength corresponding to the transmittance dropping to 50% in the transmission spectrum of the magenta filter unit drops is $\alpha_5$, a wavelength corresponding to the 50% transmittance in the transmission spectrum of the blue filter unit is $\alpha_6$, and $|\alpha_5-\alpha_6|\leq 20$ nm, a wavelength corresponding to the transmittance rising to 50% in the transmission spectrum of the magenta filter unit is $\alpha_7$, a wavelength corresponding to the 50% transmittance in the transmission spectrum of the red filter unit is $\alpha_8$, and $|\alpha_7-\alpha_8|\leq 10$ nm.

17. The filter device as claimed in claim 16, wherein $|\alpha_5-\alpha_6|\leq 5$ nm.

18. The filter device as claimed in claim 16, wherein the green filter unit is suitable for filtering white light to produce green light, the magenta filter unit is suitable for filtering white light to produce magenta light, the points in the CIE 1931 chromaticity diagram corresponding to the white light, the green light, and the magenta light fall on a same straight line.

19. A filter device, comprising:
    a red filter unit;
    a green filter unit;
    a blue filter unit; and
    a magenta filter unit, wherein a wavelength corresponding to the transmittance dropping to 50% in the transmission spectrum of the magenta filter unit is $\alpha_5$, a wavelength corresponding to the 50% transmittance in the transmission spectrum of the blue filter unit is $\alpha_6$, and $|\alpha_5-\alpha_6|\leq 20$ nm, a wavelength corresponding to the transmittance rising to 50% in the transmission spectrum of the magenta filter unit is $\alpha_7$, a wavelength corresponding to the 50% transmittance in the transmission spectrum of the red filter unit is $\alpha_8$, and $|\alpha_7-\alpha_8|\leq 10$ nm.

20. The filter device as claimed in claim 19, wherein the green filter unit is suitable for filtering white light to produce green light, the magenta filter unit is suitable for filtering white light to produce magenta light, the points in the CIE 1931 chromaticity diagram corresponding to the white light, the green light, and the magenta light fall on a same straight line.

* * * * *